(No Model.) 5 Sheets—Sheet 1.
J. LIST.
MILLING MACHINE.
No. 551,777. Patented Dec. 24, 1895.
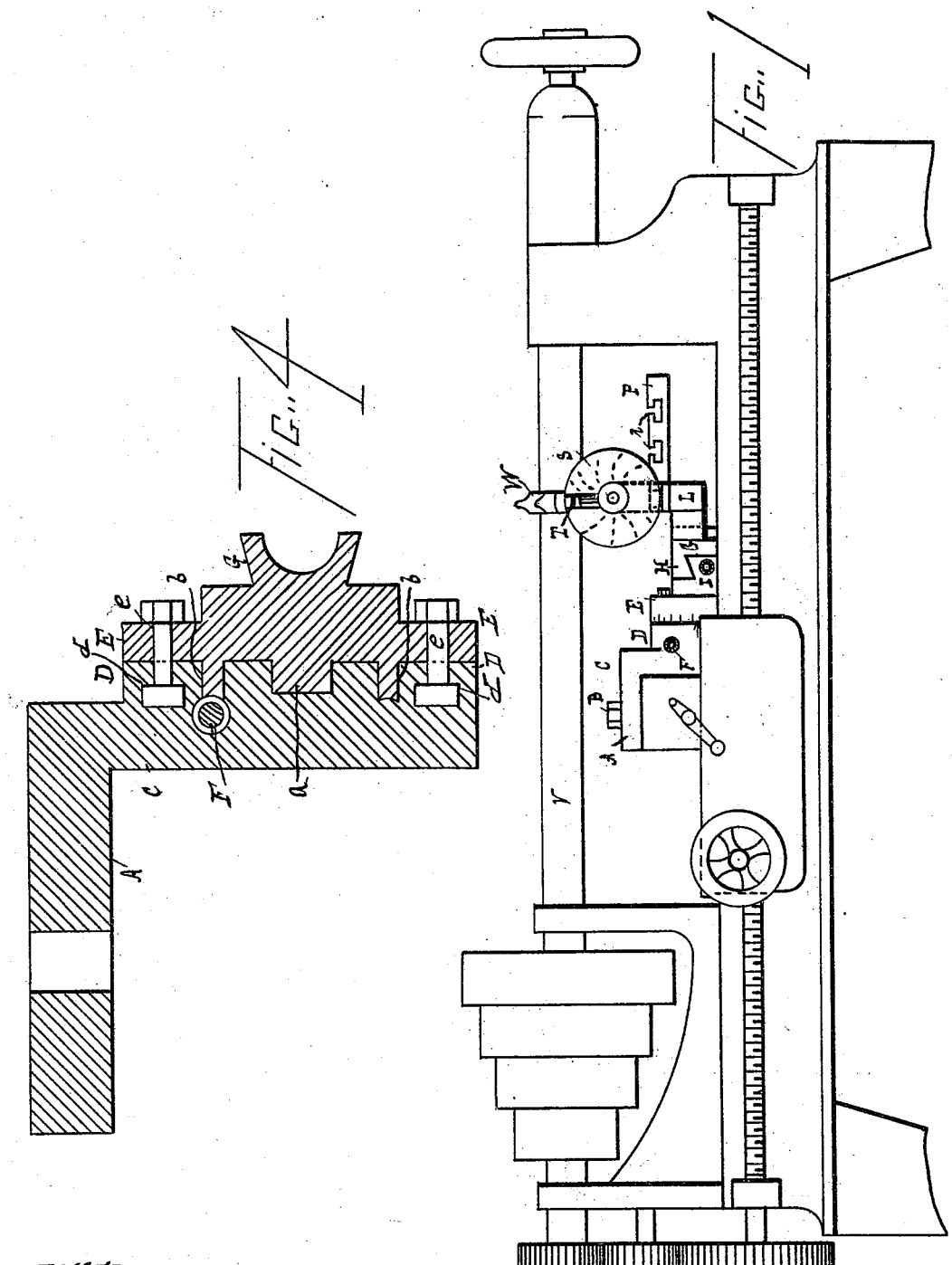
Witnesses:
Charles List
Elliott Stoddard
Inventor:
John List

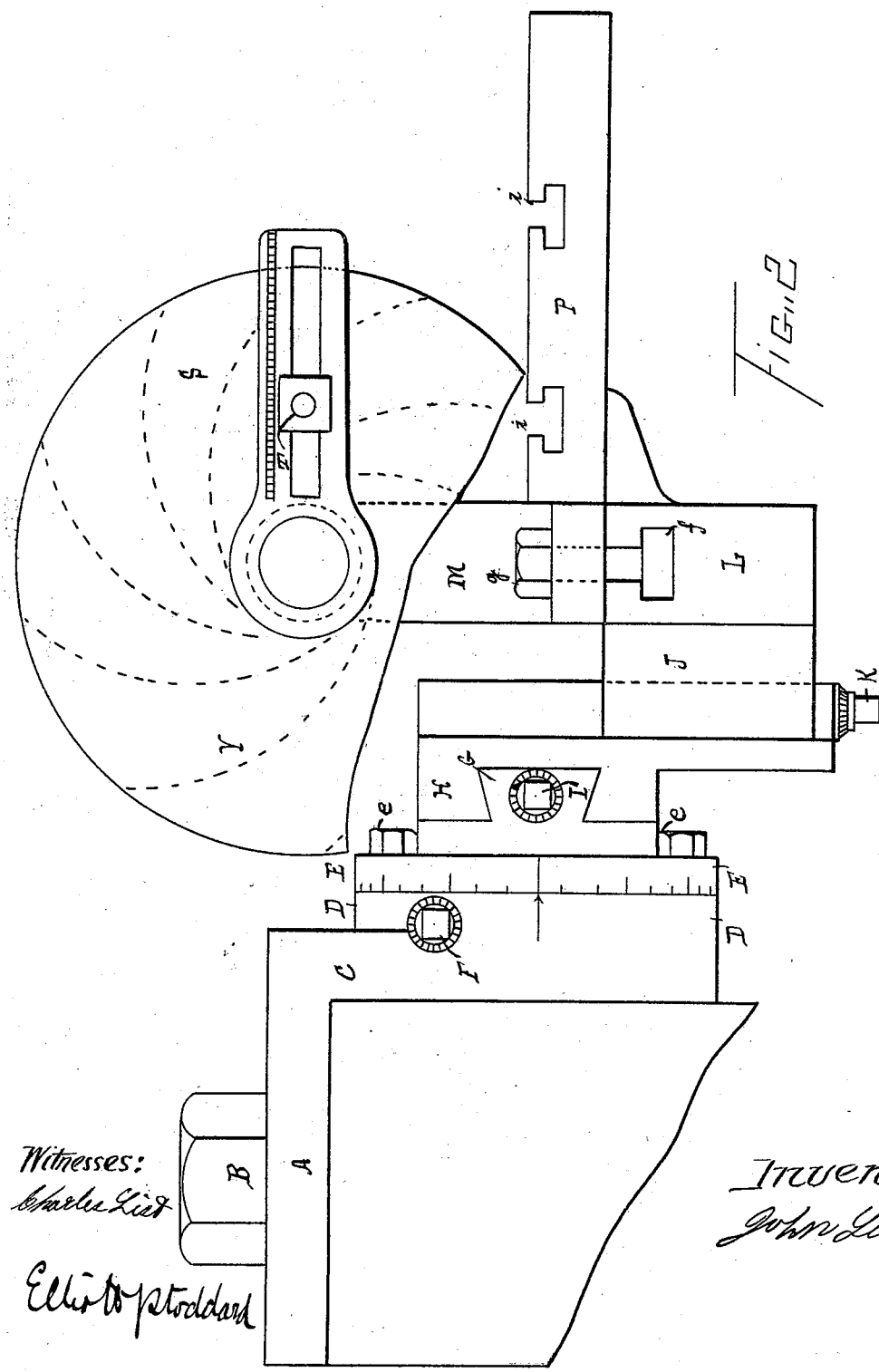

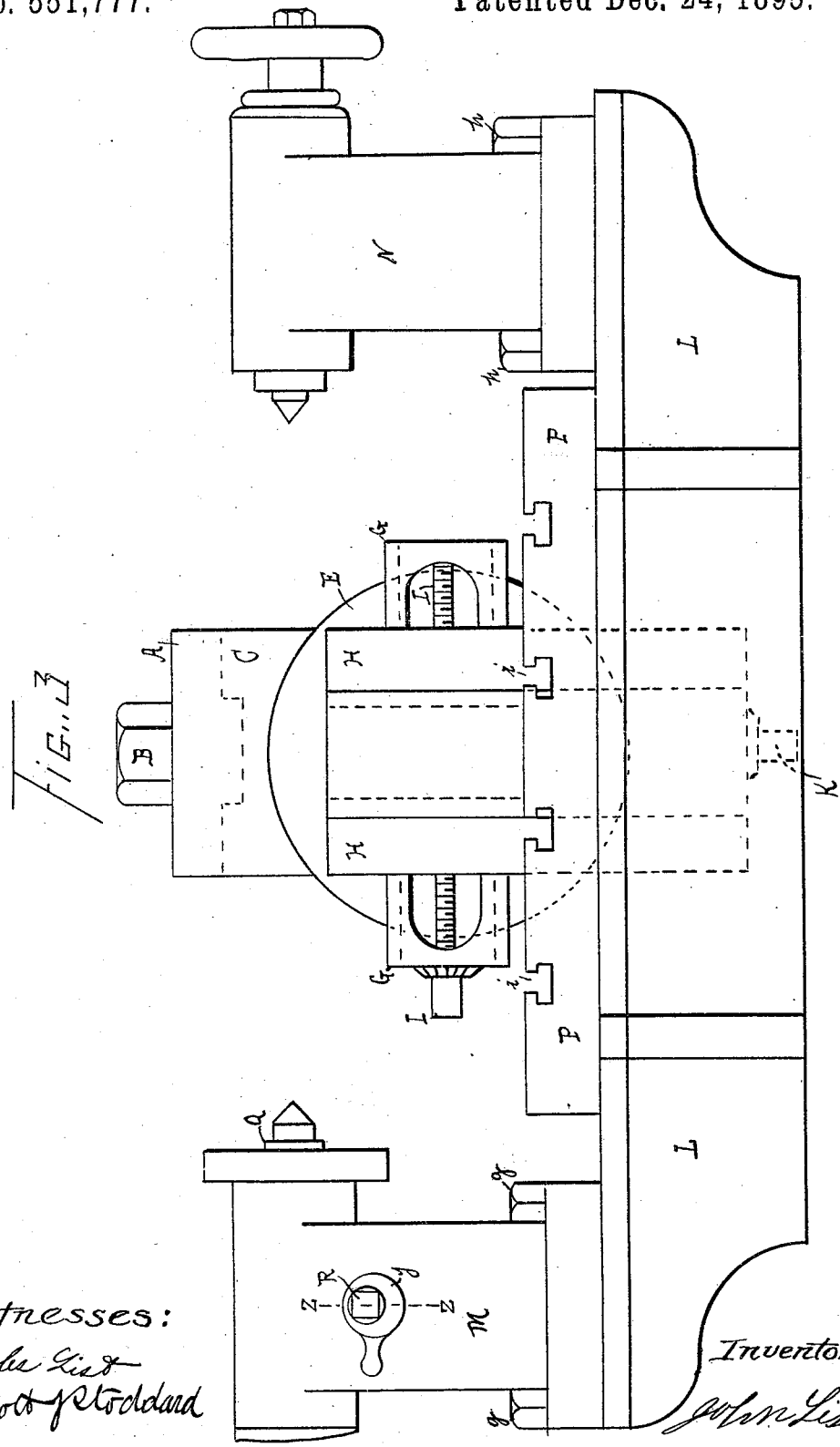

(No Model.) J. LIST. 5 Sheets—Sheet 4.
MILLING MACHINE.

No. 551,777. Patented Dec. 24, 1895.

Witnesses:
Edward S. Green
H. T. Thornton

Inventor:
John List
by Elliott Plodder
his Attorney (No Model.) 5 Sheets—Sheet 5.

J. LIST.
MILLING MACHINE.

No. 551,777. Patented Dec. 24, 1895.

Witnesses:
Edward S. Greer
Thomas B. Goodwillie

Inventor:
John List
by Elliott Stoddard
his Attorney

UNITED STATES PATENT OFFICE.

JOHN LIST, OF DETROIT, MICHIGAN.

MILLING-MACHINE.

SPECIFICATION forming part of Letters Patent No. 551,777, dated December 24, 1895.

Application filed April 12, 1894. Serial No. 507,261. (No model.)

*To all whom it may concern:*

Be it known that I, JOHN LIST, of Detroit, in the county of Wayne and State of Michigan, have invented a new and useful Improvement in Milling-Machines, of which the following is a specification.

My invention relates to milling-machines, and its principal object is to adapt an ordinary lathe to do the work of a milling-machine.

My invention consists in the improvements hereinafter described, and pointed out in the claims.

Figure 5:
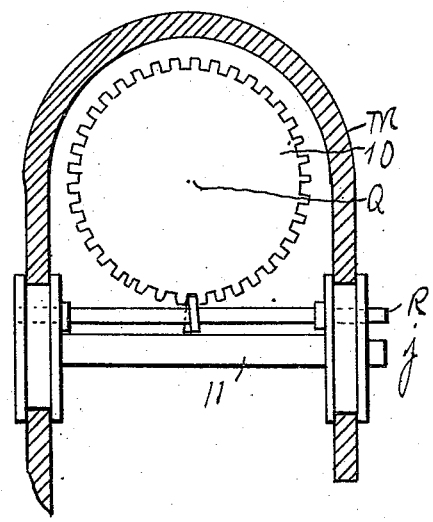
Figure 6:
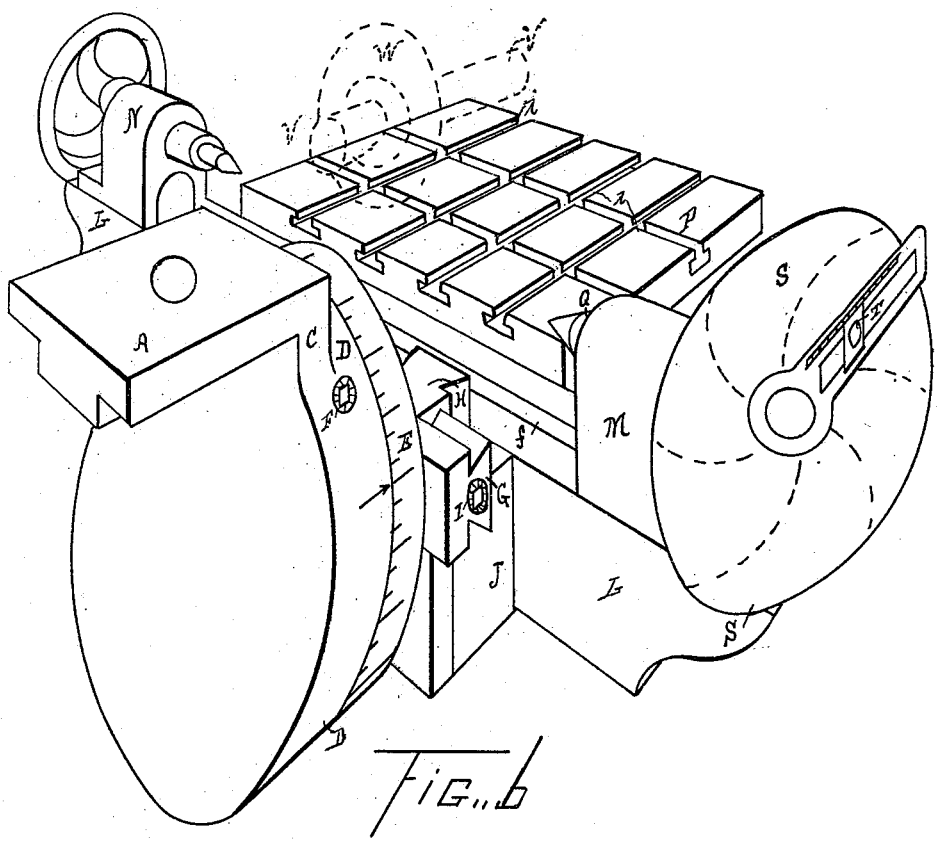

Referring to the accompanying drawings, Figure 1 is an elevation of a lathe and milling attachment embodying my invention. Fig. 2 is a side elevation of the milling attachment separate from the lathe. Fig. 3 is an end elevation of the same. Fig. 4 is a vertical central section of so much of the apparatus as is included between the lines X X and Y Y, Fig. 2. Fig. 5 is a section of the head-stock M, taken on the line Z Z, Fig. 3; and Fig. 6 is a perspective view of a milling attachment embodying my invention, the position of the milling-cutter and the mandrel which extends between the lathe centers being indicated in dotted lines.

The same letters and numerals refer to the same parts in all the views.

A is a tongue adapted to be secured to the slide-rest of a lathe by a bolt B.

C is an arm extending vertically downward from the end tongue A. A circular face D D is formed upon the arm C.

E E is a circular plate secured upon and concentric with the face D D.

*a*, Fig. 4, is a circular boss integral and concentric with the plate E E. The boss *a* fits into a corresponding hole in the arm C.

*b b* is an annular projection integral and concentric with the plate E E. Said projection fits into a corresponding groove in the arm C.

*d d* is an annular groove, T-shaped in cross-section, formed in the arm C concentric with the face D D.

The plate E E is secured upon the face D D by means of bolts and nuts *e*, the head of said bolts being in the enlarged portion of the groove *d d*. Of course the metal is cut away to permit the heads of said bolts to pass into said groove.

F is a leading-screw fitted in bearings in the arm C, and passing across said arm adjacent to the inner edge of the annular projection *b*. The inner edge of said projection is provided with teeth which mesh with the threads of the screw F. The edge of the plate E E is graduated so that its angular position can be measured. By loosening the bolts *e* and turning the screw F by a key or otherwise the angular position of the plate E E with reference to the face D D can be adjusted.

G is a ridge forming a part of, and extending diametrically across, the plate E E. The sides of said ridge are made flaring and it is hollowed out between its ends, as shown in Fig. 4.

H is a sliding block fitted upon the ridge G, and provided with a lug which extends into the groove in said ridge.

I is a leading-screw fitted in bearings in the ridge G, and extending through and engaging with threads in the lug which extends from the block H, into the hollow in said ridge. The block H may be moved forward and back on the ridge G by turning the screw I.

J is a sliding block fitted upon the block H in the same way that the block H is fitted upon the plate E. The block J is adapted to be reciprocated by the leading-screw K in a direction at right angles to that in which the block H may be moved by the leading-screw I.

L is a bed-plate forming part of the sliding block J.

*f* is a groove, T-shaped in cross-section, formed in the bed-plate L, longitudinally across the upper surface of said bed-plate.

M is a head-stock, and N is a tail-stock. Said head and tail stocks are adapted to be moved along the upper surface of the bed-plate L and to be clamped in any desired position thereon by means of bolts *g g h h*, the heads of which are in the enlarged portion of the slot *f*.

P is a bed-plate provided with the usual grooves *i i* to permit "work" to be clamped to it. The bed-plate P may be attached to or detached from the bed-plate L.

Q is a spindle in the head-stock M.

R is a leading-screw fitted in bearings in eccentrics, as *j*, Fig. 3, which eccentrics are upon shaft 11, which bears in the head-stock M. The threads of the leading-screw R mesh with the teeth of a worm-wheel 10 upon the spindle Q when said eccentrics are thrown up, and are drawn out of engagement with said worm-wheel when said eccentrics are thrown down.

S T are the usual wheel and pin by which the position of the spindle Q may be determined when the machine is being used to cut the teeth of gear-wheels.

V, Fig. 1, is a mandrel, fixed between the centers of the lathe and attached to the live-spindle of said lathe so as to turn with it.

W is the milling-wheel, fixed upon the mandrel V.

The method of operating the above-described device is as follows: Said device is firmly secured to the slide-rest of the lathe by a bolt B, as shown in Fig. 1. A mandrel, with the cutting-tool upon it, is fixed between the centers of the lathe so as to turn with the lathe. The work is then fixed between the head and tail stock M and N or upon the bed-plate P. The position of the work relative to the cutter or milling-wheel W is then adjusted by means of the leading-screws F I K R or by one or more of said screws. The feeding of the work to the cutter can be accomplished either by the automatic feed of the lathe or by the leading-screws F I K R, or by two or more of said screws combined, as the particular case may require.

It will be noticed that by the use of the above-described apparatus, the great expense of providing a separate milling-machine is avoided, the floor-room that would be required for a separate machine is saved, and all the work of a milling-machine may be done and some work that milling-machines are not adapted to do. As an example of the latter an emery-wheel may be secured to the mandrel V in place of the cutter W, a reamer or tap may be secured between the head and tail stocks M and N, a fast speed may be given to the spindle of the lathe and consequently to the mandrel V and emery-wheel, and said reamer or tap may be ground or sharpened, or a long spiral groove may be cut in a cylindrical piece by combining the motions given by the screws R and I.

Having fully described my invention, what I claim, and desire to secure by Letters Patent, is—

1. In combination with a lathe provided with an automatic feed for the slide rest thereof, a piece, A C, adapted to be secured to said slide rest, sliding blocks H, J, secured to the piece A C, and adapted to be reciprocated in different directions, with reference to the piece A, C, means for securing the work to the block J, a mandrel secured to the live spindle of said lathe and a rotary cutting tool upon said mandrel, substantially as and for the purpose described.

2. In combination with a lathe provided with an automatic feed for the slide-rest thereof, a mandrel secured to the live spindle of said lathe, a rotary cutting tool upon said mandrel, a piece A, C, adapted to be secured to said slide-rest, a plate E, E, pivoted to the piece A, C, sliding blocks H, J, secured to the plate E, E, and adapted to be reciprocated in different directions on said plate, and a head and tail stock M, N, on the block J, substantially as shown and for the purpose described.

3. In combination with a lathe provided with an automatic feed for the slide rest thereof, a mandrel secured to the live spindle of said lathe, a rotary cutting-tool upon said mandrel, a piece A, C, adapted to be secured to said slide-rest, a plate E, E, pivoted to the piece A, C, sliding blocks H, J, secured to the plate E, E, and adapted to be reciprocated in different directions, on said plate, and a grooved bed-plate L, secured to the block J, substantially as shown and for the purpose described.

4. The spindle Q, in a head stock M, a worm-wheel secured to said spindle, a leading-screw R, provided with threads adapted to engage with the teeth of said worm-wheel said leading screw bearing in an eccentric *j*, pivoted in the head stock M, said eccentric being adapted to throw said screw into and out of engagement with said wheel, substantially as shown and described.

JOHN LIST.

Witnesses:
PHILIPP LIST,
CHARLES LIST.